United States Patent
Huang et al.

(10) Patent No.: US 10,324,174 B2
(45) Date of Patent: *Jun. 18, 2019

(54) TWO DIMENSION AND THREE DIMENSION IMAGING WITH CODED PULSES BASED ON SPEED CHANGES OF SOUND/ULTRASOUND

(71) Applicants: Hai Huang, Herndon, VA (US); Tony Huang, Herndon, VA (US)

(72) Inventors: Hai Huang, Herndon, VA (US); Tony Huang, Herndon, VA (US)

(73) Assignees: Hai Huang, Herndon, VA (US); Tony Huang, Herndon, VA (US)

( * ) Notice: Subject to any disclaimer, the term of this patent is extended or adjusted under 35 U.S.C. 154(b) by 57 days.

This patent is subject to a terminal disclaimer.

(21) Appl. No.: 15/613,308

(22) Filed: Jun. 5, 2017

(65) Prior Publication Data
US 2017/0285151 A1  Oct. 5, 2017

Related U.S. Application Data

(63) Continuation of application No. 14/692,777, filed on Apr. 22, 2015, now abandoned, and a continuation of application No. 14/645,475, filed on Mar. 12, 2015, now Pat. No. 9,880,272, and a continuation of application No. 14/532,125, filed on Nov. 4, 2014, now abandoned.

(51) Int. Cl.
| | |
|---|---|
| G01S 7/52 | (2006.01) |
| G01S 7/523 | (2006.01) |
| G01S 15/89 | (2006.01) |
| G01S 15/02 | (2006.01) |
| G01S 15/58 | (2006.01) |

(52) U.S. Cl.
CPC .............. *G01S 7/523* (2013.01); *G01S 15/02* (2013.01); *G01S 15/58* (2013.01); *G01S 15/8986* (2013.01)

(58) Field of Classification Search
CPC ...... G01S 15/58; G01S 15/8986; G01S 15/02; G01S 7/523
USPC .................... 367/89; 600/437, 448, 454, 455
See application file for complete search history.

(56) References Cited

U.S. PATENT DOCUMENTS

| | | | | |
|---|---|---|---|---|
| 5,877,997 A  * | 3/1999 | Fell | ...................... | G01F 23/2962 |
| | | | | 367/908 |
| 2006/0064015 A1* | 3/2006 | Davies | ................ | G01S 7/52028 |
| | | | | 600/447 |
| 2012/0266676 A1* | 10/2012 | Mueller | .................... | G01F 1/66 |
| | | | | 73/632 |

* cited by examiner

*Primary Examiner* — Isam A Alsomiri
*Assistant Examiner* — Amie M Ndure

(57) ABSTRACT

During transmission, a speed of sound pulses gradually reduces due to acoustic impedance. Regulating a length or a density or a sound speed of the sound pulses affects their average speed in the transmitting medium, sound intensity and detecting depth. Time of flight (TOF) and TOF shift can be used to calculate the depth and moving speed of detecting objects. Calculating a speed of moving objects by simultaneously detecting TOF shift at same site from two separated piezoelectric (PZT) elements improves the testing results with accuracy, simplification and reproducibility. Coding sound pulses to obtained the TOF and the TOF shift will simultaneously calculate the depth and the moving speed of sampling points, which can be used to construct 2D and 3D images for these motionless and/or moving sampling points. Coded sound pulses also improves the quality of the imaging.

19 Claims, 17 Drawing Sheets

TWO DIMENSION AND THREE DIMENSION IMAGING WITH CODED PULSES BASED ON SPEED CHANGES OF SOUND/ULTRASOUND

CROSS-REFERENCES TO RELATED APPLICATIONS

This application claims priority to U.S. patent application Ser. No. 14/532,125 filed on Nov. 4, 2014, and U.S. patent application Ser. No. 14/645,475 filed on Mar. 12, 2015, and U.S. patent application Ser. No. 14/692,777 filed on Apr. 22, 2015, the entire contents of all of which are incorporated herein by reference.

FIELD OF THE DISCLOSURE

The present disclosure generally relates to the field of sound technology and, more particularly, relates to a method for calculation of detecting depth and speed of motionless and/or moving objects based on speed changes of sound/ultrasound.

BACKGROUND

Wave is a kind of energy transformation between kinetic and potential energy, which spreads between an interface of two kinds of fluid transmitting medium with different density. Within just one transmitting medium, sound should move as a kind of a pulse. Transmission of sound pulses is actually energy traveling of acoustic pulses in transmitting medium. If there is acoustic impedance during the transmission of the sound pulses, the acoustic impedance will resist the movement of the sound pulses and consume its energy. Currently, it is supposed that speed of the sound pulses is identical in the same medium during the transmission. But, in the invention, the speed of the sound pulses is considered as gradually reduced during the transmission due to the acoustic impedance of the transmitting medium, which gradually depletes the energy of the sound pulses. According direct relationship between the acoustic impedance and the speed of the sound pulses in the transmitting medium, higher speed of the sound pulses will meet higher acoustic impedance and consume more its energy during the transmission. So, the question is if the speed of the sound pulses can still keep the same as currently supposed when its energy is gradually reduced until exhausted? If the speed of the sound pulses is gradually reduced during transmission, the detecting depth may be wrong based on calculating the detecting depth with fixed sound speed for the sound pulses with different frequencies.

Current sound theory correlates frequencies of the sound pulses with their detecting depth, with lower frequency of the sound pulses having deeper detecting depth. But, a thin piezoelectric element (PZT) can make the sound pulses with a high frequency as well as a low frequency, which means the sound pulses with both frequencies sending from the same PZT element have the same level of energy. So, the question is what are main factors that actually affect the detecting depth of the sound pulses?

Sound pulses can be reflected by motionless or moving objects, and according Doppler theory, it is currently considered that forward moving objects can compress the frequency of the sound pulses and reversely moving objects decompress the frequency of the sound pulses. So, Doppler mechanism has been widely used to measure the velocity of the moving objects based on frequency shift, such as medical sound machine and Doppler radar. Doppler theory is based on a frequency change of sound waves due to a change of distance between a detector and detecting objects. But, for the pulsed wave ultrasound, setting a gate location fixes the distance between a detector and detecting objects, which cannot explain Doppler shift. For the pulsed wave ultrasound, aliasing is explained with insufficient Doppler sampling rate of the frequency domain analysis. But, the theory of the frequency domain can not completely solve the aliasing problem of the pulsed wave ultrasound and the color ultrasound.

Thus, there is a need to overcome above problems to provide methods for more accurately calculating the detecting depth of sound pulses, correctly calculating the speed of the moving objects and correcting the aliasing for the pulsed wave and the color ultrasound.

BRIEF SUMMARY OF THE DISCLOSURE

Sound transmits in transmitting medium as a form of pulse. A sound pulse contains its length, density and speed, which decide its intensity and traveling distance. Nowadays, ultrasound is considered as their frequencies of more than 20 kilohertz, which limits a length of their pulses and creates their sound intensity below a hearing threshold of most of people. So, ultrasound belongs to sound with very low intensity that most of people can not hear it. As a kind of energy traveling in transmitting medium, a speed of sound will gradually reduce due to an acoustic impedance, which resists its movement and consumes its energy.

One aspect of the invention, correcting the transmitting distance of sound pulses can rectify the registration of the detecting depth, which improves the quality of sound images. Current sound theories and applications are based on the identical speed in the same transmitting medium with various frequencies of the sound pulses. But, the invention is based the speed reduction of sound during the transmission in the medium due to the loss of their energy caused by acoustic impedance. For sound, calculating of the detecting depth of sound pulses based on the identical average speed of the sound pulses will cause miscalculation of the detecting depth due to different average speeds for the sound pulses with different frequencies and intensity. Because a length and a density and a traveling time of the sound pulses can affect the average speed of the sound pulses, they can be used to calculate the sound speed reducing coefficient and correct the registration of detecting depth of sound pulses, which improve the quality of images.

In another aspect of the invention, changing thickness and density of piezoelectric (PZT) elements and sound speed in the PZT elements can regulate intensity of the sound pulses, which affect their detecting depth. Nowadays, sound pulses with its frequencies of more that 20 kilohertz are considered as ultrasound, because most of people can not hear it. But, the fact is that the sound pulses with its frequencies of more than 20 kilohertz limit a length of their pulses and create a sound intensity below a hearing threshold of most of people. The detecting depth of the sound pulses is not directly related to their frequencies, but related to the intensity of the sound pulses. The thickness and the density of PZT elements decide the length and density of the sound pulses. So, selecting the PZT elements with greater density and higher speed of sound pulses in the PZT elements will increase the detecting depth for high frequency sound.

Another aspect of the invention is detecting the speed of moving objects based on time of flight (TOF) shift of time domain analysis for a continuous, a pulsed and a color ultrasound. It is based on the speed changes of reflected sound pulses by the moving objects, which change the TOF and the TOF shift of the sound pulses. No matter in the continuous or the pulsed or the color ultrasound, when checking the speed of blood flow, the sound system always detects the reflected sound pulses from certain locations where sound beam cross with blood vessels to calculate the TOF shift. So, the speed of the moving objects can be calculated based on the TOF shift. An angle between sound beams and a direction of moving objects affects the value of the TOF shift. Calculating the speed of moving objects by simultaneously detecting TOF shift from two separated PZT elements from same site avoids the effect of tortuous blood vessels and variant performances of sonographers, which improves the testing results with accuracy, simplification and reproducibility.

In the invention, the theory of above TOF and TOF shift can be used to completely correct an aliasing for the pulsed and the color ultrasound no matter how fast the speed of the moving objects will be. A calculated TOF is based on the average speed of sound pulses in the transmitting medium and distance between transducer and the gate. A detected TOF is the time that the sound system interprets from emitted sound pulses and reflected sound pulses. An actual TOF, which is an actual traveling time of the sound pulses between transducer and the detecting objects. If the speed of the moving objects is too fast, which makes the actual TOF excesses its aliasing limit, the sound system will misinterpret the reflected sound pulses and generate the aliasing TOF. For the forward moving objects, the aliasing limit for the actual TOF is less than the value of half calculated TOF. If the actual TOF is smaller than the aliasing limit, the sound system will misinterpret the reflected sound pulse and add a value of calculated TOF into the actual TOF, which generates the aliasing TOF. Then the aliasing TOF is greater than the calculated TOF. So, the aliasing TOF shift is below the baseline, which represents the moving objects toward opposite direction. For reversely moving objects, their TOF aliasing limit is that the actual TOF is greater than the value of one and half calculated TOF. If the actual TOF is greater than its aliasing limit, the sound system will misinterpret the detected TOF and subtract a value of calculated TOF from the actual TOF. Then the aliasing TOF is smaller than the calculated TOF. So, the aliasing TOF shift is above the baseline, which represents the moving objects as forward direction. So, in the invention, a computer program is designed to identify and correct the aliasing TOF shift no matter how fast the speed of the moving objects will be. Identifying and correcting the aliasing TOF shift can also be used to differentiate the colors of aliasing from the colors of the turbulent flow, which benefits clinical judgment and diagnosis.

The continuous ultrasound doesn't contain information of depth and the pulsed ultrasound may generate a problem of aliasing. In the invention, a method of coded sound pulses is used to take advantages of the continuous ultrasound and the pulsed ultrasound, which can obtain information of depth and velocity from the detecting objects at the same time, and avoid the aliasing. Within each pulse duration, different numbers of sound pulses are sent, which is assigned a pulse character. Coded pulse characters are emitted with a same rest period, which is between each pulse duration. Coded pulse characters endow each emitted pulse character with information of a sending time. The TOF of the pulse characters can be obtained between the time of sending the pulse characters and receiving the corresponding pulse characters, and TOF shift can be obtained from the difference between a sending rest period and the corresponding receiving period of the pulse characters. Therefore, the information about depth (z) and the velocity (v) of the sampling points can be obtained from the TOF and the TOF shift. In the invention, with coded pulses, the dataset of two axes (x, y) collecting from the sample points can be used to construct two-dimension (2D) images for motionless and/or moving sample points of target organs. Furthermore, by collecting plurality of succession of 2D dataset to establish three-dimension dataset of orthogonal value (x, y, z), with a fourth value of the velocity (v) for each sampling points, a volumetric image (3D) of the motionless and/or moving sampling points can be generated for target organs. At the same time, by confirming received pulse characters and correctly registration, the background signals and artifacts will be effectively filtered out, which improves the quality of images.

Based on the speed reduction of the sound during the transmission, the intensity of the sound pulses, the TOF, and the TOF shift can more accurately present the relationship between the sound pulses with the depth and the speed of the detecting objects than the results from the identical sound speed and the Doppler shift. Other aspects or embodiments of the present disclosure can be understood by those skilled in the art in light of the description, the claims, and the drawings of the present disclosure.

BRIEF DESCRIPTION OF THE DRAWINGS

The following drawings are merely examples for illustrative purposes according to various disclosed embodiments and are not intended to limit the scope of the present disclosure.

DETAILED DESCRIPTION

Figure 1:
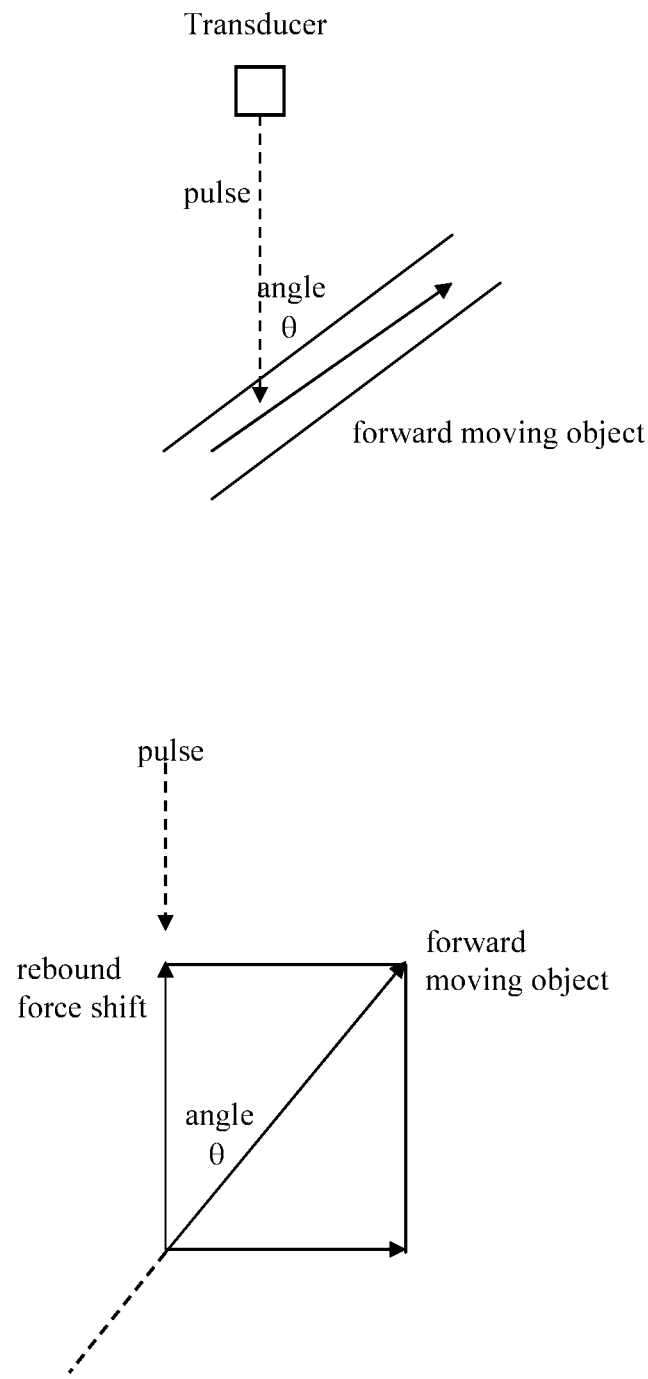
FIG. 1 is a schematic illustration of rebound force of forward flow to sound pulse.

Reference will now be made in detail to exemplary embodiments of the disclosure, which are illustrated in the accompanying drawings. Wherever possible, the same reference numbers will be used throughout the drawings to refer to the same or like parts.

Speed of Sound Pulses Gradually Reduces During Transmission

Usually, wave is formed between interface of two kinds of materials with different density, which transfer energy between gravitational energy and kinetic energy. Transmitting just within one medium, a sound energy should be transferred as a form of a pulse. So, in the invention, continuous sound and pulsed sound are referred as continuous wave or pulsed wave ultrasound. A sound pulse includes its length, density and speed, which form sound intensity. The length and density of the sound pulse is related to thickness and density of materials that create the sound. The thicker material gives a longer sound pulse, which is like different sounds from different chords of a violin or a piano. The density of the sound is related to density of materials that create the sound. The higher density of the materials is, the greater density of the sound will be, such as the sound difference launched from wood or metal. The sound speed is also related to the speed sent from the material, such as different sound strength when hitting a key of a piano with different forces. Hitting the key more strongly will bring louder sound, which is related to faster sound speed. So, the intensity of the sound pulse is the multiplication value of its length, density and speed, which is correlated to sound pressure. A sound pulse with greater intensity will travel further, and the speed of the sound pulse will gradually reduce due to the acoustic impedance of transmitting medium, which gradually depletes the energy of the sound.

Sound intensity (kg/MS)=sound length (M)×sound density (Kg/M$^3$)×sound speed (M/S)

M=meter; Kg=kilogram; S=second

Piezoelectric (PZT) elements can generate piezoelectric effect. The PZT elements in a transducer of a sound machine emit sound pulses with their intensity, which is related to the length, density, and speed of the sound pulses. Nowadays, the speed of the sound pulses with different frequencies is considered as identical in the same medium. But, actually the speed of the sound pulses should not be identical as supposed during the transmission, and it will gradually reduce due to an acoustic impedance of the transmitting medium. As bullets shooting from a machine gun, their speed is gradually reduced due to loss of their energy caused by resistance of air. But, frequency of the bullets at any sites of trajectory may be kept the same. The transmission of the sound pulses has the similar mechanism. The acoustic impedance is decided by density of the transmitting medium and the speed of the sound pulses in the transmitting medium. The power of electric output on PZT elements decides the maximal speed of sound pulses that enters the transmitting medium. During the transmission, the speed of the sound pulses gradually reduces due to the loss of their energy caused by the acoustic impedance, which will finally exhaust the energy of the sound pulses. But, Sound pulses keep the same frequency during the transmission, including their reflected frequency. A rate of the speed change of the sound pulses is related to the density of the transmitting medium, sound speed in the transmitting medium, and the length and density of the sound pulses. So, a speed reducing coefficient can be used to express their relationship with the speed changes.

Calculation of Detecting Depth of Sound Pulses Based on Speed Change of the Sound Pulses One aspect of the invention is calculation of detecting depth of the sound pulses based on the speed reduction of the sound pulses during the transmission. Nowadays, calculating the detecting depth is based on an identical speed of the sound pulses with different frequencies in the transmitting medium, which may miscalculate the detecting depth due to a variation of the average speed of the sound pulses with the different sound intensity. As the sound pulses leave the PZT elements and enter the transmitting medium, the speed of the sound pulses is at their maximal speed. Then, under effect of the acoustic impedance, the speed of the sound pulses will gradually reduce during the transmitting process. The longer the sound pulses travel, the slower the speed of the sound pulses will be. As a result, if calculated with identical travelling speed of sound pulses, actual depths of reflections from proximal area are shortened and the distances of reflections from distal area are elongated in the sound images. In order to correct this detecting depth error due to the speed changes of the sound pulses, the speed reducing coefficient of the sound pulses can be used to calculate a depth shift. The speed reducing coefficient is directly proportional to the density of the transmitting medium and the traveling time and constant k, and inversely proportional to the length and density of the sound pulses, which are correlated to the density and thickness of PZT elements. The depth shift is caused by speed reduction of the sound pulses during the transmission. $V_m$ is a maximal speed of the sound pulses as they just enter a transmitting medium. t is the traveling time from emitting to receiving the sound pulses. The constant k is related to acoustic characteristics of the transmitting medium. $V_{avg}$ is an average speed of the sound pulses in the transmitting medium. The detecting depth is a half value of multiplication result of the average speed and the traveling time.

$$\text{Speed reducing coefficient} = \frac{k \times \text{medium density} \times t}{PZT \text{ density} \times PZT \text{ thickness}}$$

$$\begin{aligned}\text{Detecting depth} &= (V_m \times t/2) - \text{Depth shift} \\ &= (V_m \times t/2) - (\text{speed reducing coefficient} \times V_m \times t/2) \\ &= V_m \times \left(1 - \frac{k \times \text{medium density} \times t}{PZT \text{ density} \times PZT \text{ thickness}}\right) \times t/2\end{aligned}$$

$$V_{avg} = V_m \times \left(1 - \frac{k \times \text{medium density} \times t}{PZT \text{ density} \times PZT \text{ thickness}}\right)$$

$$\text{Detecting depth} = V_{avg} \times t/2$$

Currently there is just one identical speed of the sound pulses with various frequencies in each transmitting medium. For instance, the speed of the sound pulses in the soft tissue is about 1540 meter/second. But a change of the length or the density or the traveling time of the sound pulses affects their average speed in the transmitting medium. Such as there may be a difference of the speed reducing coefficient between the sound pulses with 4 MHz and the sound pulses with 8 MHz because of the difference of the length of the sound pulses. So, the intensity of the sound pulses is different, which causes their different average speed in the soft tissue and different detecting depth. Therefore, calculating the detecting depth with an identical speed for different sound frequencies may cause an error in their actual traveling depth. Because multiple factors affect the energy and the speed of the sound pulses during the transmitting, such as reflection, absorption and scattering, the mathematic equation of the average speed of the sound pulses just mainly reflects a relationship of the average speed with the length and density of the sound pulses and their traveling time. Therefore, it is necessary to more accurately calculate the detecting depth based on the different average speed of the sound pulses in the transmitting medium according to the change of the length of the sound pulses and their traveling time.

The Intensity of the Sound Pulses Affect their Detecting Depth

In another aspect of the invention, regulating the intensity of the sound pulses affects their detecting depth. As the power transferred per unit area, the intensity of the sound pulses equals the multiplication value of the length, density and speed of the sound pulses. Increasing one or more of the thickness and the density of PZT elements and sound speed in the PZT elements increases the intensity of the sound pulses, which increase their detecting depth.

In current sound theory, the attenuation coefficient is directly proportional to the frequency of the sound pulses. The lower the frequency of the sound pulses is, the smaller the attenuation coefficient will be. As the frequency of the sound pulses is inversely proportional to the thickness of the PZT elements, lower frequency of the sound pulses has the more thickness of PZT elements.

Frequency=sound speed in PZT/2×PZT thickness attenuation coefficient (dB/cm)=frequency (MHz)/2

Nowadays, sound pulses with its frequencies of more that 20 kilohertz are considered as ultrasound due to their high frequencies. But, the fact is that the sound pulses with its frequencies of more than 20 kilohertz creates a sound intensity below a hearing threshold of most of people. Actually, the frequencies are not directly correlated to their attenuation coefficient, because a thin PZT element can send the sound pulses with high frequencies as well as low frequencies. But, the thickness and the density of the PZT elements are directly related to the length and density of the sound pulses, which affect the intensity of the sound pulses. The more thickness and the density of the PZT elements are, the greater length and density of the sound pulses will be, which increase the intensity of the sound pulses. As a heavier ball has ability of further traveling distance, the sound pulses with greater intensity will have greater penetrating depth. At the same time, the speed of the sound pulses is correlated to its intensity. The speed of sound pulses sent out from the PZT elements is directly correlated to an acoustic characteristic of the PZT elements and the power of electric output on the PZT elements. So, changing the thickness and the density of the PZT elements and the sound speed in the PZT elements can regulate the intensity of the sound pulses and their detecting depth.

Sound intensity=sound length×sound density×sound speed

Sound intensity=acoustic impedance×traveling distance

Increasing Detecting Depth for High Frequency Sound by Increasing the Density of PZT Elements and Sound Speed in the PZT Elements Currently, in order to increase the frequency of the sound pulses, the thickness of the PZT elements is reduced, which decreases the length of the sound pulses and their detecting depth. But, in the invention, selecting the PZT elements with higher sound transmitting speed and increasing the power of electric output on the PZT elements will increase a frequency of the sound pulses. At the same time, increasing the density of the PZT elements increases the density of the sound pulses, but not just decreasing the thickness of the PZT elements, it will increase the frequency as well as the intensity of the sound pulses. As the result, it increases the detecting depth for high frequency sound.

Frequency=sound speed in PZT/2×PZT thickness

Improving Axial Resolution by Decreasing Length of the Sound Pulses

Currently increasing frequency of the sound pulses is used to increase axial resolution. Actually, the axial resolution is decided by length of the sound pulses, which is related to the thickness of the PZT elements. But, the frequency of the sound pulses is not directly related to the axial resolution of the sound pulses, because thin PZT elements can generate high frequency as well as low frequency of the sound pulses. Less thickness of the PZT elements generates shorter sound pulses and smaller numerical values of spatial pulse length, which improves the axial resolution.

At the same time, the thickness of the PZT elements also limits the highest frequency a sound system can reach, which is less than a value of sound speed in PZT elements divided by a length of the sound pulses.

Highest frequency<sound speed in PZT/PZT thickness

Moving Objects Change TOF and TOF Shift of the Sound Pulses

Nowadays, a speed of a sound pulse is considered as unchanged in a transmitting medium. Doppler shift is a change in frequency of sound pulses, which is related to TOF changes caused by distant changes between a detector and a target. Doppler mechanism is widely used to detect the speed of moving objects. According Doppler mechanism, a distance of sound resources, such as a coming or leaving motorcycle, is changing. Therefore, a frequency of sound pulses emitted from an engine of the motorcycle is relatively compress or decompressed due to the movement, which can be used to calculate to its speed. But, for pulsed sound, setting a gate will fix a distance between the detector and sampling points. The TOF changes are not caused by the change of distance between the detector and moving targets. So, from my point of view, based on speed changes during sound transmission, TOF shift is a change in TOF of sound pulses caused by speed changes of the sound pulses within a fixed detecting distance between a detector and sampling points.

Figure 2:
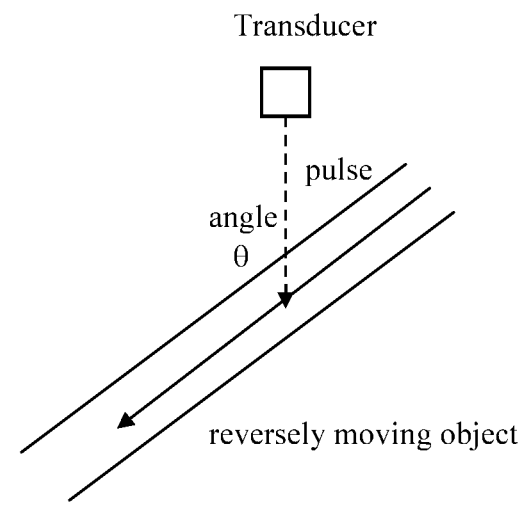
FIG. 2 is a schematic illustration of rebound force of reversed flow to sound pulse.
Figure 2:
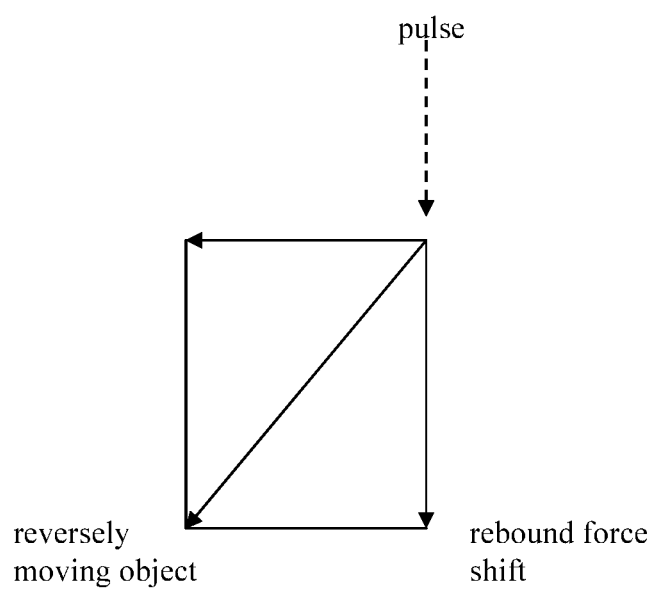

As containing the energy, the sound pulses can be reflected by motionless or moving objects. No matter in the continuous or the pulsed or the color ultrasound, when checking speed of blood flow, the sound system always detects the reflected sound pulses from fixed locations where the sound beam cross with blood vessels to calculate TOF shift of the reflected sound pulses. So, distances from the reflecting sites are fixed. It is more like playing table tennis, a racket hits a ball and changes a speed of the reflected ball, which changes its TOF. Comparing to motionless objects, moving objects will change the rebounding force to the sound pulses. As in the FIG. 1, forward moving objects will generate the forward rebound force shift against the sound pulses. The forward rebounding force shift is decided by a speed and an angle θ of the moving objects with the sound beam. The faster speed of the moving objects and smaller angle θ will generate greater forward rebounding force shift, which increases the speed of the reflected sound pulses. The smallest angle θ is zero. So, its TOF is decreased and smaller than the TOF from motionless objects (baseline). As the result, the TOF shift is increased and above the baseline. On the contrary, as in the FIG. 2, reversely moving objects will generate reversed rebounding force shift with the same direction of emitted sound pulses, which reduces the rebounding force. The faster speed of the moving objects and greater angle θ will create greater reversed rebounding force shift, which decreases the reflected speed of the sound pulses. The greatest angle θ is 180 degree. So, its TOF is increased and greater than the baseline. As the result, the TOF shift is below baseline.

As the length and density of the sound pulses is directly correlated to the thickness and density of the PZT elements, changing the length and density of the sound pulses also affects their TOF and TOF shift. For the forward moving objects, increasing the length and density of the sound pulses will have smaller rate of increased speed of the reflected pulses. It elongates their TOF and reduces their TOF shift. Decreasing the length and density of the sound pulses have greater rate of increased speed of the reflected sound pulses, which will shorten their TOF and increase their TOF shift. For reversely moving objects, increasing the length and density of the sound pulses will have smaller rate of decreased speed of the reflected sound pulses. It shortens its TOF and decreases their TOF shift. Decreasing the length and density of the sound pulses have greater rate of decreased speed of the reflected sound pulses, which elongates their TOF and increase their TOF shift.

So, one aspect of the invention is calculating the speed of the moving objects based on the TOF shift for the continuous or the pulsed or the color sound. As mentioned above, the speed of the sound pulses will gradually reduce, and the moving objects will generate the rebounding force shift, which changes the speed of the reflected sound pulses, their TOF and TOF shift. Therefore, the TOF shift can more accurately present relationship between the speed of the moving objects and characters of the sound pulses.

Calculating Velocity of Moving Objects Based on TOF Shift for Continuous Sound

Currently, it is considered that speed of the sound pulses is fixed in the same medium during the transmission. The moving objects will change the frequency of the reflected sound pulses due to distance change between the detector and the moving objects. The forward moving objects will compress the reflected frequency, which is higher than the emitted frequency. Its Doppler shift is above the baseline. The reversely moving objects will decompress the reflected frequency, which is lower than the emitted frequency. Its Doppler shift is below the baseline. So, calculating Doppler shift of the continuous sound is based on difference between the reflected frequency and the emitted frequency. $V_{objects}$ is a speed of the moving objects, f is a frequency of a transducer, and V is a speed of the sound pulses in a transmitting medium.

Doppler shift = reflected frequency − emitted frequency $$\text{Doppler shift} = \frac{2 \times V_{objects} \times f \times \cos(\theta)}{V}$$

Figure 7:
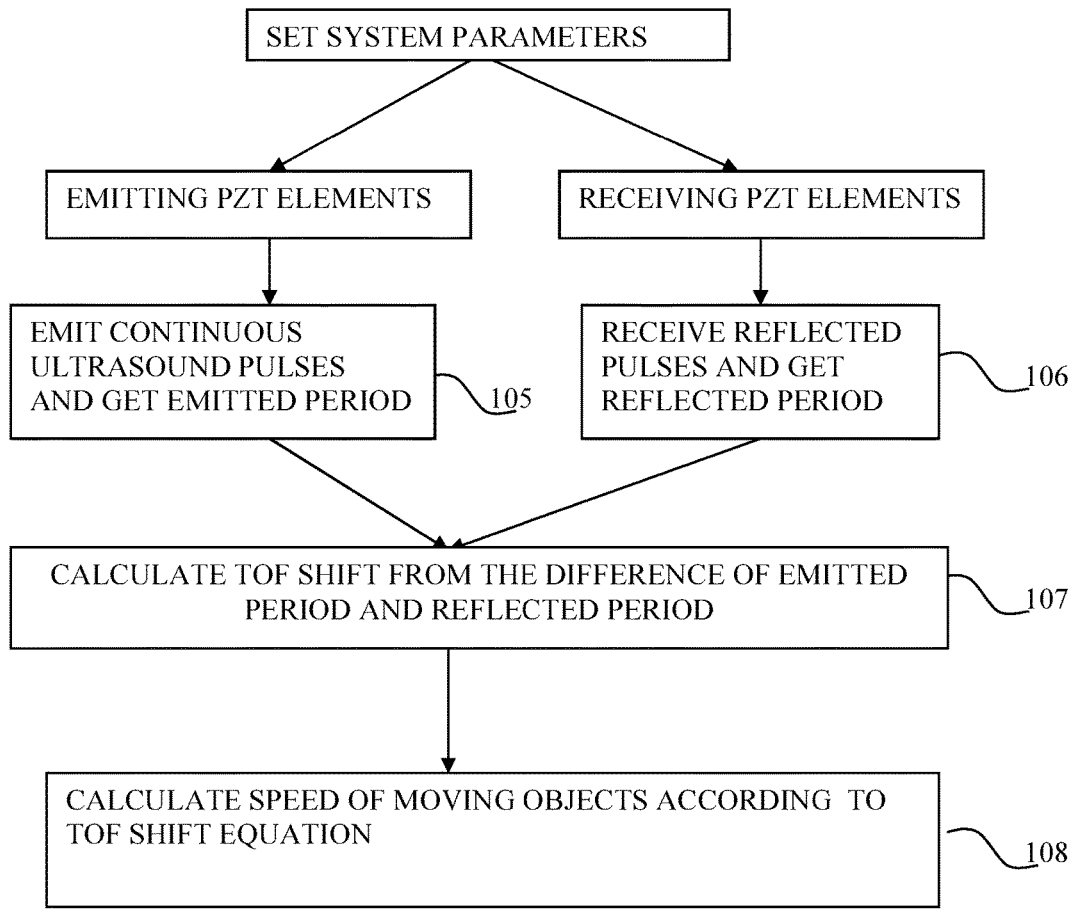
FIG. 7 is a schematic illustration of computer program to calculate TOF shift of continuous wave sound.

The invention discloses that a TOF shift of the continuous sound is used to calculate the speed of the moving objects. The TOF shift of the continuous sound is difference between a time of emitting period and a time of reflected period. There are two PZT parts in continuous sound transducer. As in the FIG. 7, the emitting PZT part emits the continuous sound pulses with identical emitted period between previous and following emitted sound pulses (105), which is decided by the sound system. The receiving PZT part receives the reflected sound pulses from sampling points below the PZT elements and detects the reflected period between previously and following reflected sound pulses for each sampling points (106). The reflected period is decided by the speed of the moving objects and the angle of the moving objects with a beam of the sound pulses. If the sound pulses are reflected from the sampling points with the motionless objects, the reflected period equals to the emitted period and their TOF shift is zero. So, the emitted period is set as a baseline, and the TOF shift equals zero at the baseline. If the sound pulses are reflected from the sampling points with the moving objects, the reflected period and their TOF shift are variable depending on the velocity of the moving objects. Then, the sound system obtains the TOF shift for the sampling points with the moving objects from difference between the emitted period and the reflected period, and calculates velocity of the moving objects according to the equation of the TOF shift (108).

emitted period = the time between previous and following emitted pulses reflected period = the time between previously and following reflected pulses TOF shift = emitted period − reflected period $$\text{TOF shift} = \frac{2 \times V_{objects} \times f \times \cos(\theta)}{V_{avg}}$$

As 101 in FIG. 3, the emitted period is the time between the previously and following emitted pulses, which forms the baseline. The reflected period is the time between previously and following reflected sound pulses. If the sound pulses are reflected from the sampling point (N) with the moving objects that are vertical to the sound beam, the emitted period equals to its reflected period, and their TOF shift is zero. But, if the sound pulses are reflected from the sampling point (M) with the forward moving objects, the speed of the reflected sound pulses will be accelerated due to the increasing rebounding force, which shorten the TOF M'. So, the reflected period from the sampling point will be less than the time of the emitted period, which generates TOF shift M' and is above the baseline. On the contrary, for the sampling point (O) with the reversely moving object, the TOF O' will be elongated due to the reduced rebounding force and the speed of the reflected sound pulses. So, the reflected period will be greater than the time of the emitted period, which generates the TOF shift O' and is below the baseline.

Figure 3A:
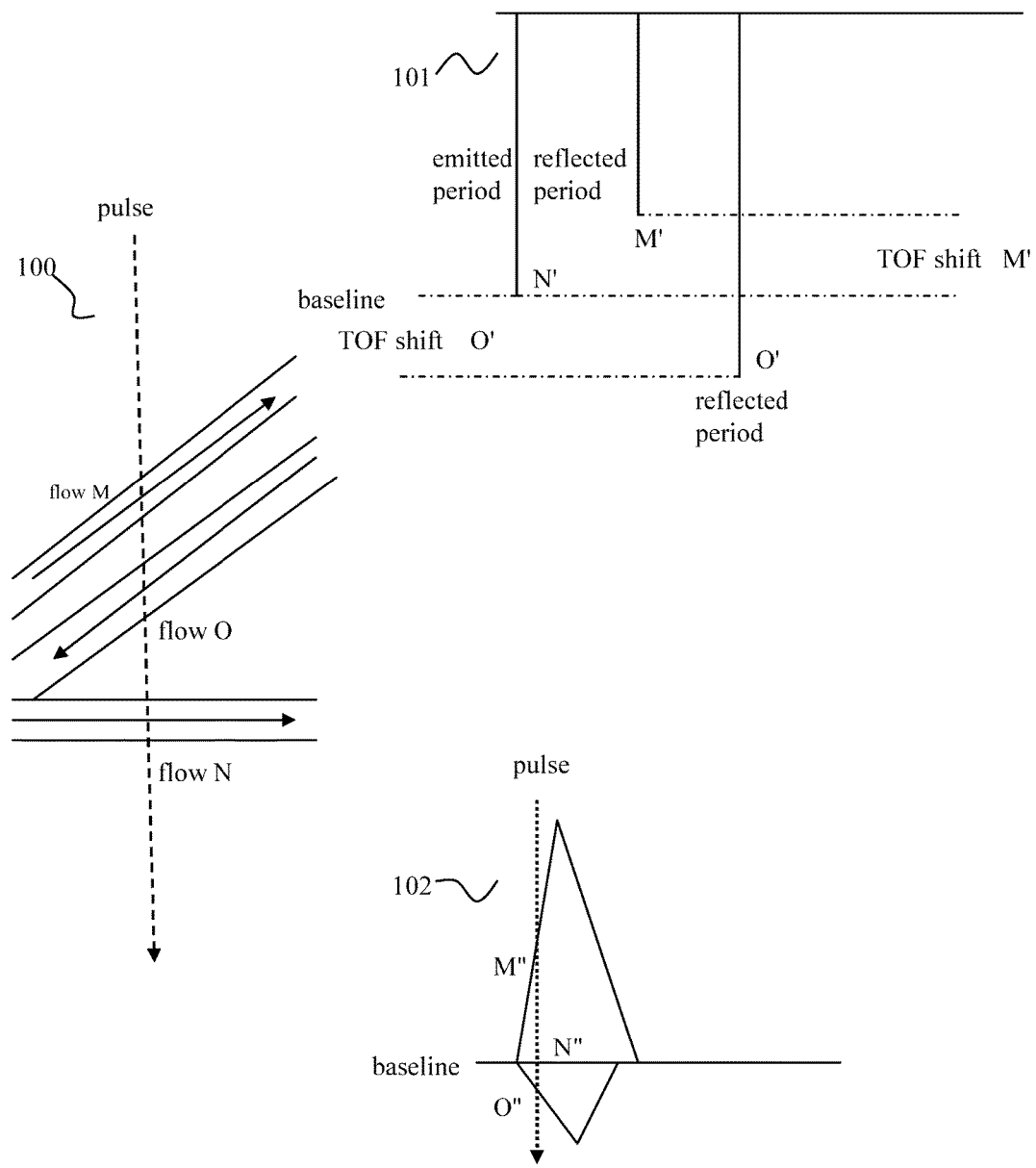
FIG. 3a is a schematic illustration of spectrum for TOF shift of continuous wave ultrasound.
Figure 3B:
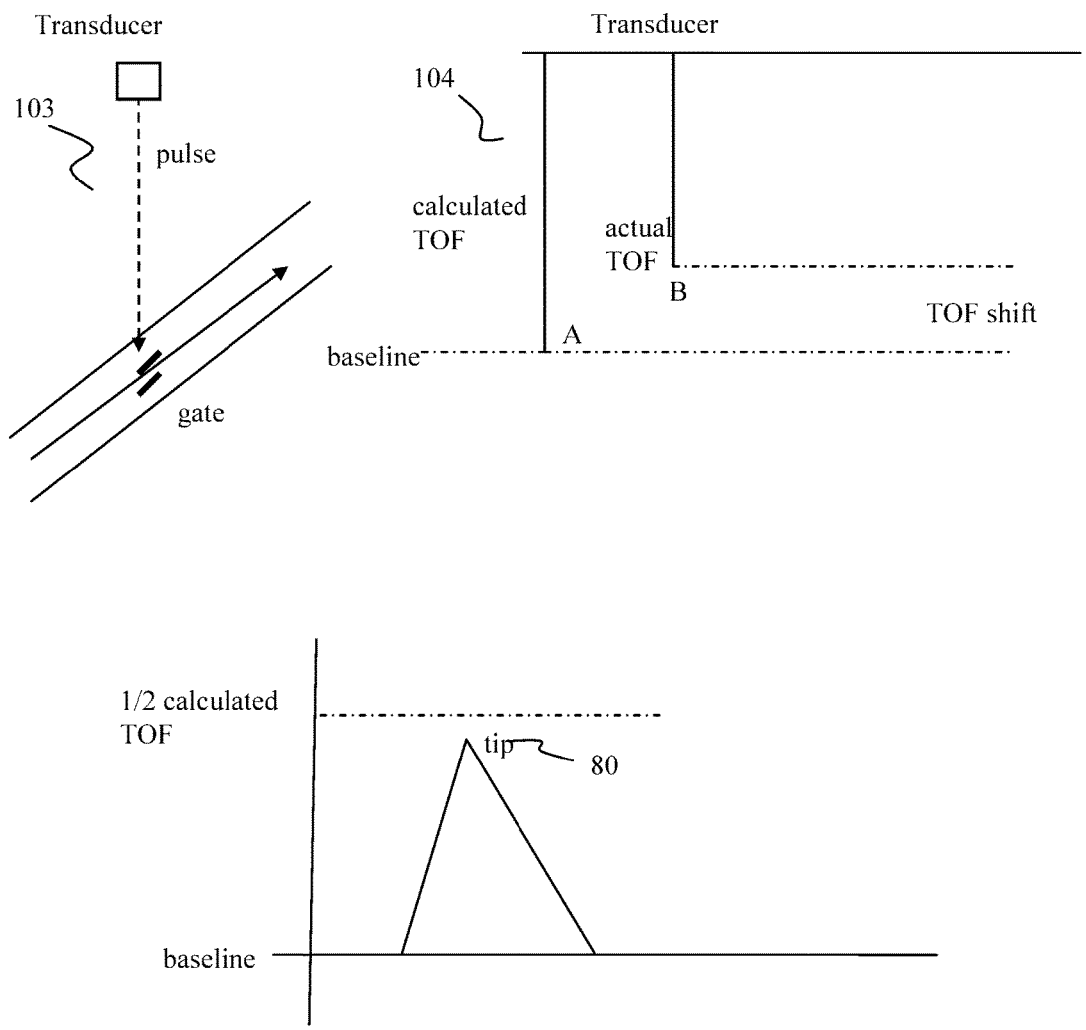
FIG. 3b is a schematic illustration of TOF shift and the profile of TOF shift for forward moving objects of pulsed wave ultrasound.
Figure 3C:
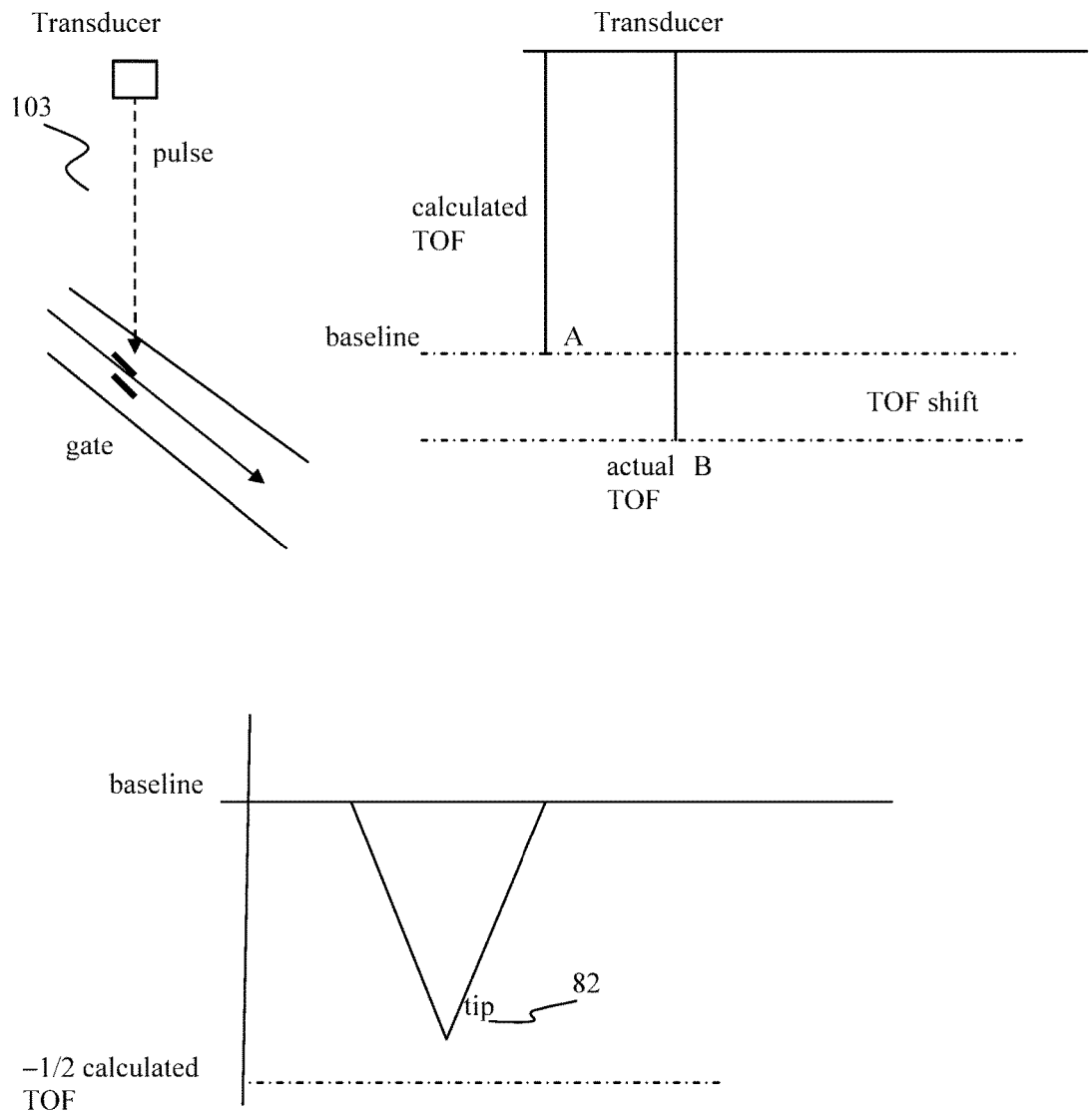
FIG. 3c is a schematic illustration of TOF shift and profile of TOF shift for reversely moving objects of pulsed wave ultrasound.

As 100 in FIG. 3, for the continuous sound, a receiving PZT element collects the reflected sound pulses from all sampling points from an area under the receiving PZT elements. If there are multiple sampling points with the moving objects with different velocities toward the PZT elements, they will rebound the sound pulses with different reflected speeds and TOFs, which generate different TOF shifts related to these sampling points. Then the sound system will trace and compare a list of these reflected pulses and respectively present their TOF shifts on TOF shift spectrum. For continuous sound, because there are usually multiple moving objects under the transducer with different velocities, such as multiple blood vessels, its TOF shift spectrum often presents as spectral broadening, and the bigger TOF shift from the sampling points with the moving objects of the faster velocity is located at the higher position of TOF shift spectrum as 102 in FIG. 3*a*. So, a computer program can be used to calculate the velocity of the moving objects based on the values of the TOF shift as in FIG. 7.

Calculating Velocity of Moving Objects by TOF Shift for Pulsed and Color Ultrasound There is only one part of PZT elements in a transducer of the pulsed ultrasound, which sends and receives sound pulses. So, the transducer has to receive previously reflected pulses before sending next emitted pulses. In order to detect velocity of the moving objects, a gate is set with a fixed distance from the transducer. A sampling point is a location where the ultrasound pulses are reflected and detected. A size of the gate decides numbers of sampling points within the gate. So, based on the average speed of the sound pulses and the distance between the transducer and the gate, a calculated TOF can be obtained as A in FIG. 3*b*, which is set as the baseline, and the TOF shift at the baseline equals to zero. The detected TOF is that the sound system interprets TOF from the emitted and reflected sound pulses, which can be affected by the moving objects. The actual TOF is the time the sound pulses actually travel between the transducer and the gate. As the sound pulses leave a transducer and enter the transmitting medium, their speed is at maximal and will gradually reduce during the transmitting process. The moving objects will rebound the sound pulses and change the detected TOF, which generates the TOF shift between the calculated TOF and detected TOF. The calculated TOF is based on the average speed of sound pulses in the transmitting medium. So, when the actual TOF excesses its aliasing limit and the value of TOF shift is smaller than the value of a half calculated TOF, sound system will misinterpret the detected TOF, which generates the aliasing. Before the aliasing, the detected TOF is the actual TOF, and after the aliasing, the detected TOF is the aliasing TOF. The TOF shift is difference between the calculated TOF and the detected TOF. For a forward moving object, it accelerates the speed of the reflected pulses, which shorten its actual TOF as B in FIG. 3*b*. So, the actual TOF is smaller than the calculated TOF, and the TOF shift is above the baseline. As increasing the speed of the moving objects, the value of the detected TOF decreases and the value of the TOF shift increases, tip of the profile of the TOF shift is away from the baseline (80 in FIG. 3*b*). On the contrary, reversely moving objects elongate their actual TOF, which is greater than the baseline, and the TOF shift is below the baseline. As the speed of the moving objects increases, the value of the detected TOF and the value of the TOF shift both increase, and the tip of the profile of the TOF shift is away from the baseline (82 in FIG. 3*c*). Then the velocity of the moving objects can be calculated according the value of the TOF shift.

$$TOF \text{ shift} = \text{calculated } TOF - \text{detected } TOF$$

$$TOF \text{ shift} = \frac{2 \times V_{objects} \times f \times \cos(\theta)}{V_{avg}}$$

Identifying and Correcting Aliasing for Pulsed Sound

For the pulsed sound, there is the aliasing, which is caused by the sound system misinterpreting the detected TOF from the reflected sound pulses. If the speed of the moving objects is too fast, and makes the actual TOF excesses its aliasing limit, the sound system will misinterpret it and the detected TOF becomes an aliasing TOF. Then the aliasing TOF shift is located on opposite side of the baseline, which presents the moving objects as toward opposite direction. The aliasing TOF shift also disrupts continuation of the profile of the TOF shift.

Figure 4:
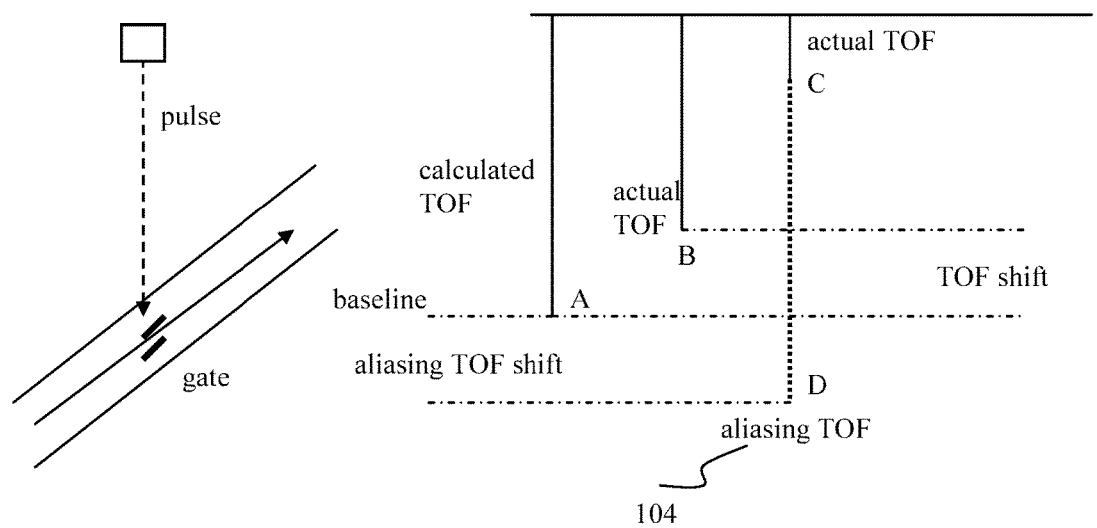
FIG. 4 is a schematic illustration of aliasing TOF and aliasing TOF shift
Figure 5A:
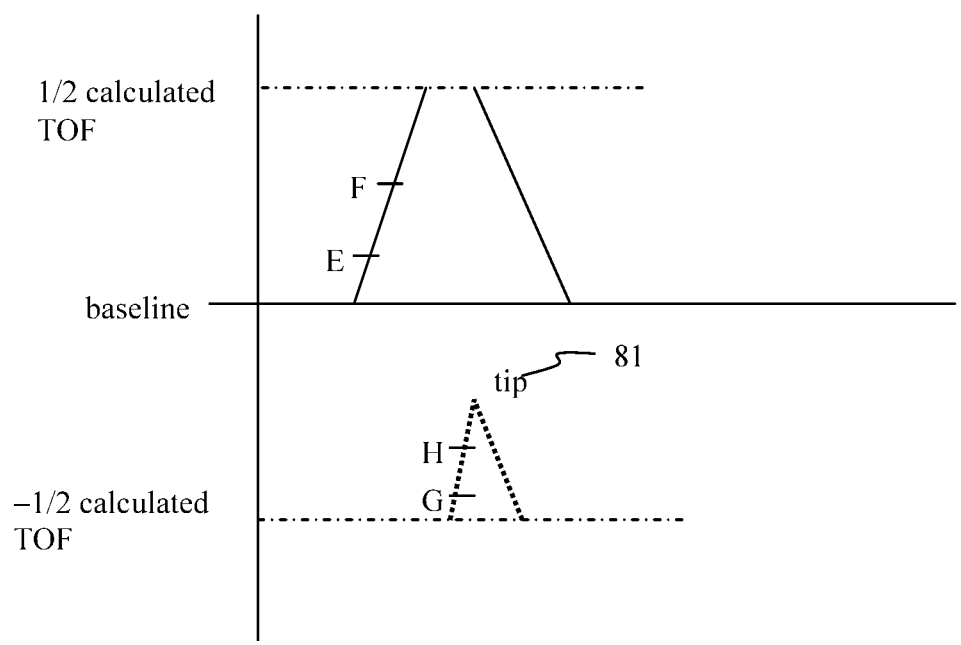
FIG. 5a is a schematic illustration of profile of aliasing TOF shift for forward flow of pulsed wave ultrasound.
Figure 5B:
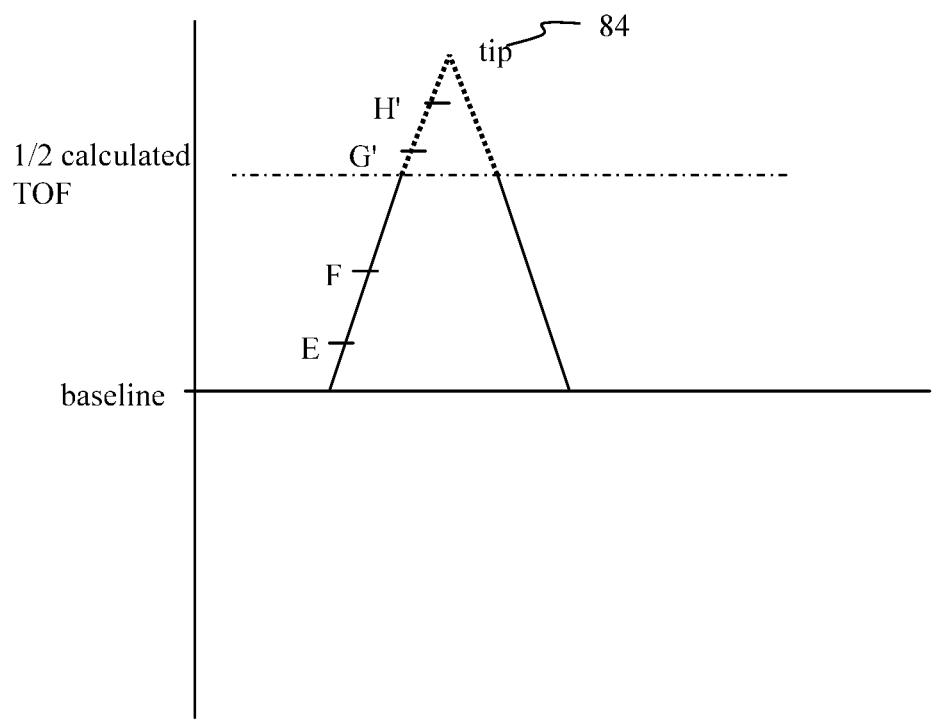
FIG. 5b is a schematic illustration of profile of corrected TOF shift for forward flow of pulsed wave ultrasound.

For forward moving objects, the aliasing limit of the actual TOF is less than the value of half calculated TOF. if the actual TOF is smaller than its aliasing limit, the sound system will misinterpret the reflected pulses, and the aliasing TOF is a value of an actual TOF adding a calculated TOF, which is larger than the calculated TOF (104 in FIG. 4). So, the aliasing TOF shift becomes below baseline, which misrepresents the moving objects moving toward opposite direction. As the result, before the actual TOF excesses its aliasing limit, the value of the TOF shift is above the baseline (from E to F in FIG. 5). But, after the actual TOF excesses its aliasing limit, the value of the aliasing TOF shift is below the baseline (G and H in FIG. 5*a*); As the speed of the moving objects increases, both the value of the aliasing TOF and the value of the aliasing TOF shift decrease; and the tip of the profile of the aliasing TOF shift is toward the baseline (81 in FIG. 5*a*), which discontinues the profile of the TOF shift.

Aliasing TOF=actual TOF+calculated TOF

Aliasing TOF shift=calculated TOF−aliasing TOF

Aliasing TOF shift=−actual TOF

Figure 8:
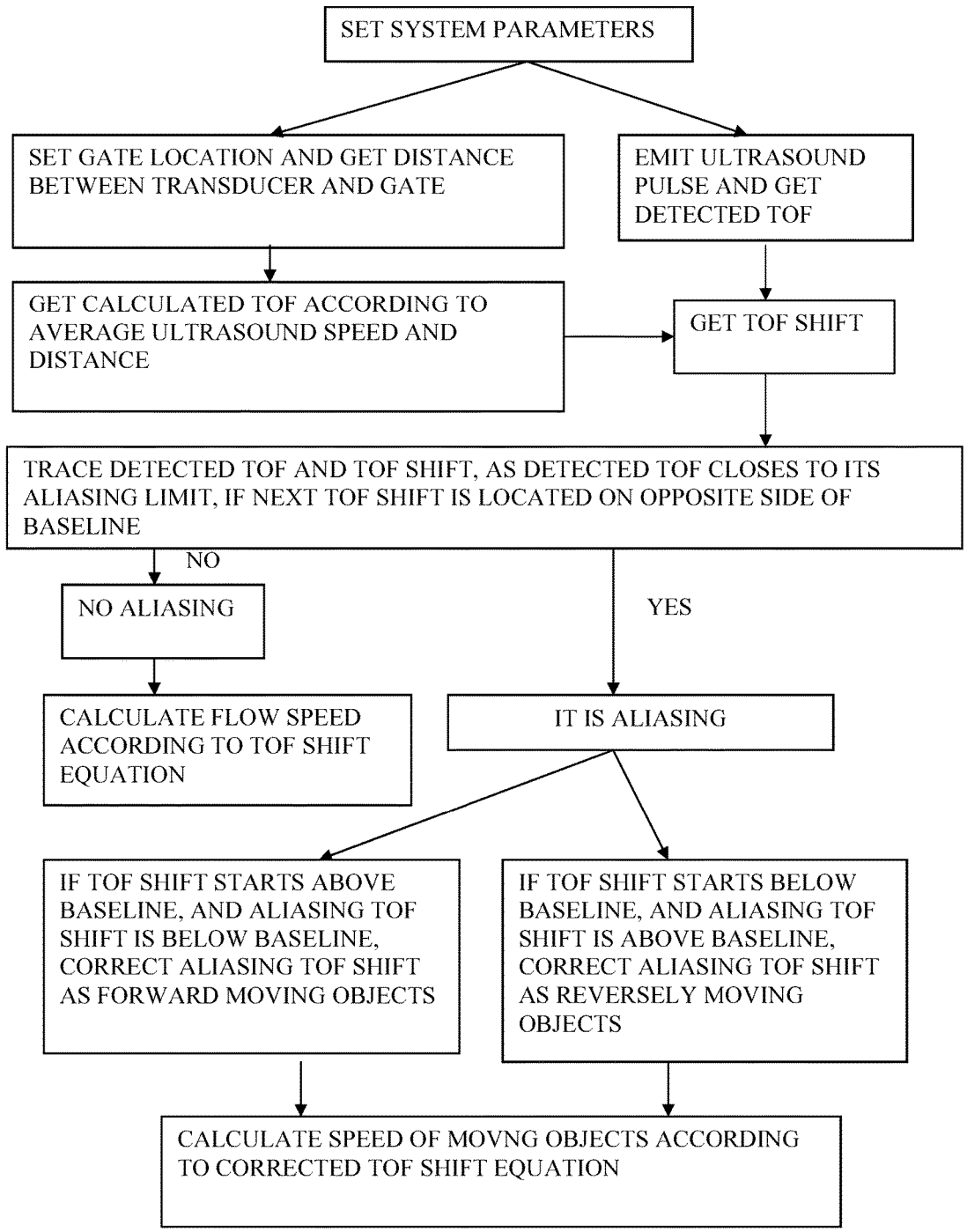
FIG. 8 is a schematic illustration of computer program to identify and correct aliasing TOF shift, and calculate the speed of moving objects for pulsed wave and color ultrasound.

So, in the invention, a computer program is designed to identify and correct the aliasing TOF shift. For the forward moving objects, the actual TOF is smaller than calculated TOF, and its TOF shift is above the baseline. As the speed of moving objects is increased, its actual TOF keeps decrease and smaller than the calculated TOF, and the TOF shift keeps increase and above baseline. But, after the actual TOF excesses its aliasing limit, the aliasing TOF becomes greater than the calculated TOF, and the aliasing TOF shift becomes below the baseline. The computer program will trace and compare the value of the following TOF and TOF shift with the value of the previous TOF and TOF shift. If the value of the TOF and the TOF shift approaches the value of half calculated TOF, and the value of following TOF shift is below the baseline, which discontinues the profile of the TOF shift. It is the aliasing TOF shift. After identifying the aliasing TOF shift, the sound system will register the corrected TOF shift by subtracting the value of the aliasing TOF shift from one calculated TOF (116 in FIG. 8).

TOF shift=calculated TOF−actual TOF

Aliasing TOF shift=−actual TOF corrected TOF shift=calculated TOF−|aliasing TOF shift|

After rectifying the registering errors of TOF shift, the value of the corrected TOF shift will keep increase as increase of the speed of the moving objects, and the tip of the profile of the TOF shift is away from the baseline (84 in FIG. 5*b*), which reestablish the continuation of the profile of the TOF shift (FIG. 5*b*), and the value of the correct TOF shift can be used to calculated the velocity of the moving objects.

Figure 6A:
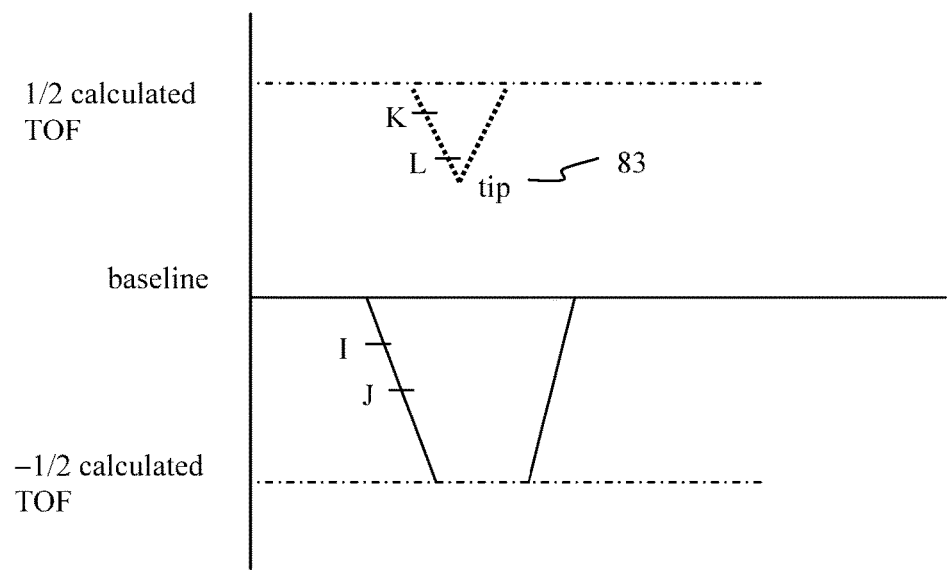
FIG. 6a is a schematic illustration of profile of aliasing TOF shift for reversed flow of pulsed wave sound.

For the reversely moving objects, the rebounding force is reduced, which decreases the reflected speed of the sound pulses and increases their TOF, which is greater than the value of the calculated TOF. So, the value of the TOF shift is below the baseline. For the reversely moving objects, the aliasing limit of the actual TOF is larger than the value of one and half calculated TOF. If the value of the actual TOF excesses its aliasing limit, the sound system will misinterpret the reflected sound pulses and the aliasing TOF is the value of the actual TOF subtracting a calculated TOF, which is smaller than the calculated TOF. So, the aliasing TOF shift will be above the baseline; as the speed of the reversely moving objects keeps increase, the aliasing TOF is increased but the aliasing TOF shift is decreased, which make the tip of the profile of TOF shift is toward baseline (83 in FIG. 6a). As a result, the continuity of the profile of TOF shift is disrupted (FIG. 6a). In the invention, the computer program is used to identify the aliasing. As the value of actual TOF is close to the value of one and half calculated TOF and TOF shift approaches the value of half calculated TOF, if following TOF shift is above the baseline, the aliasing TOF shift is identified.

Aliasing TOF=actual TOF−calculated TOF

Aliasing TOF shift=calculated TOF−aliasing TOF

Aliasing TOF shift=2×calculated TOF−actual TOF

Figure 6B:
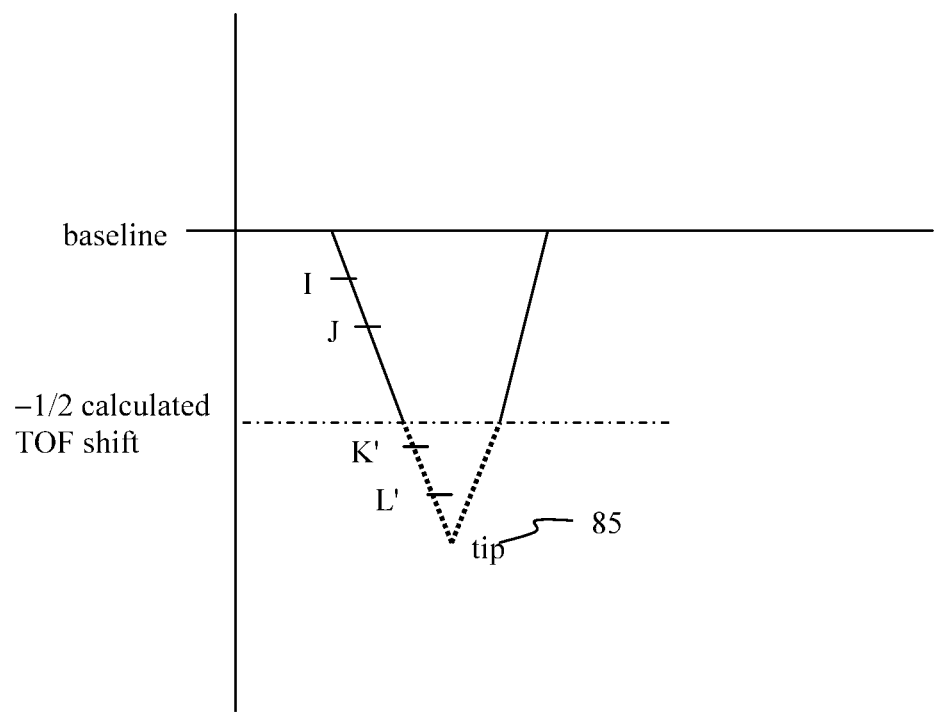
FIG. 6b is a schematic illustration of profile of corrected TOF shift for reversed flow of pulsed wave ultrasound.

After identifying the aliasing TOF shift, the computer program will rectify the aliasing TOF shift by subtract the value of a calculated TOF from the value of the aliasing TOF shift, which is based on following equations:

TOF shift=calculated TOF−actual TOF aliasing TOF shift=2×calculated TOF−actual TOF correct TOF shift=aliasing TOF shift−calculated TOF After correcting the aliasing TOF shift, the corrected TOF shift will increase as the speed of the moving objects keeps increase, which makes the tip of the profile of the corrected TOF shift away from the baseline. The corrected TOF shift will reestablish the continuation of the profile of the TOF shift (FIG. 6b), and it can be used to calculate the velocity of the moving objects.

Another method of avoiding the happening of aliasing is modifying the computer program in the sound system to prevent adding or subtracting the value of a calculated TOF into the detected TOF after the actual TOF excesses its aliasing limit.

Differentiating Color of Aliasing from Color of Turbulent Flows for Color Ultrasound For the color ultrasound, sound system automatically sets different baselines at regular distance along the sound beam. The TOF from reflected sound pulses is compared with their respective baseline and get their TOF shift. Then colors are assigned according to a value of the TOF shift to represent a velocity of the moving objects. But, there are similar color patterns between color of the aliasing and color of turbulent flows. For the aliasing pattern, the color of the aliasing mistakenly presents as the moving objects toward opposite side after the actual TOF excesses its aliasing limit. For the turbulent flows, the color of the turbulent flows truly presents their moving direction. So, this will make the difficulties for clinical judgment and diagnosis for pathological situations. In the invention, differentiating the color of the aliasing from the color of the turbulent flows is based on the characters of the TOF shift of different colors.

Figure 9:
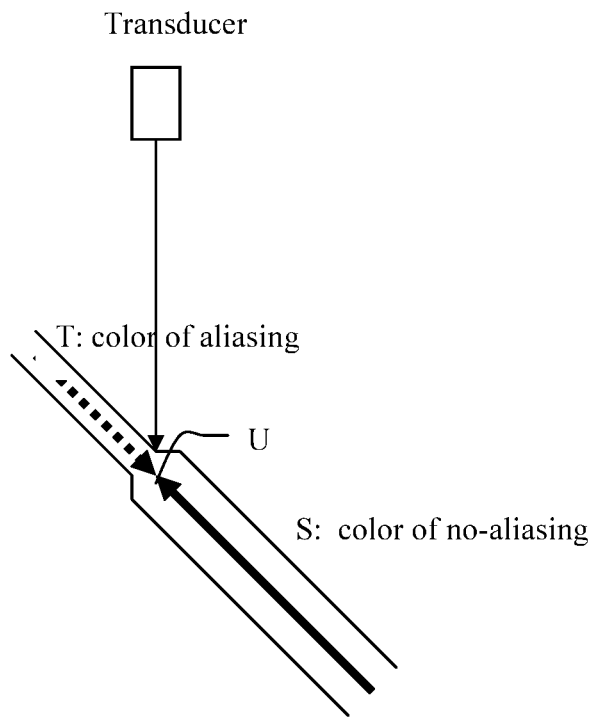
FIG. 9 is a schematic illustration of the color of aliasing in color ultrasound.
Figure 11:
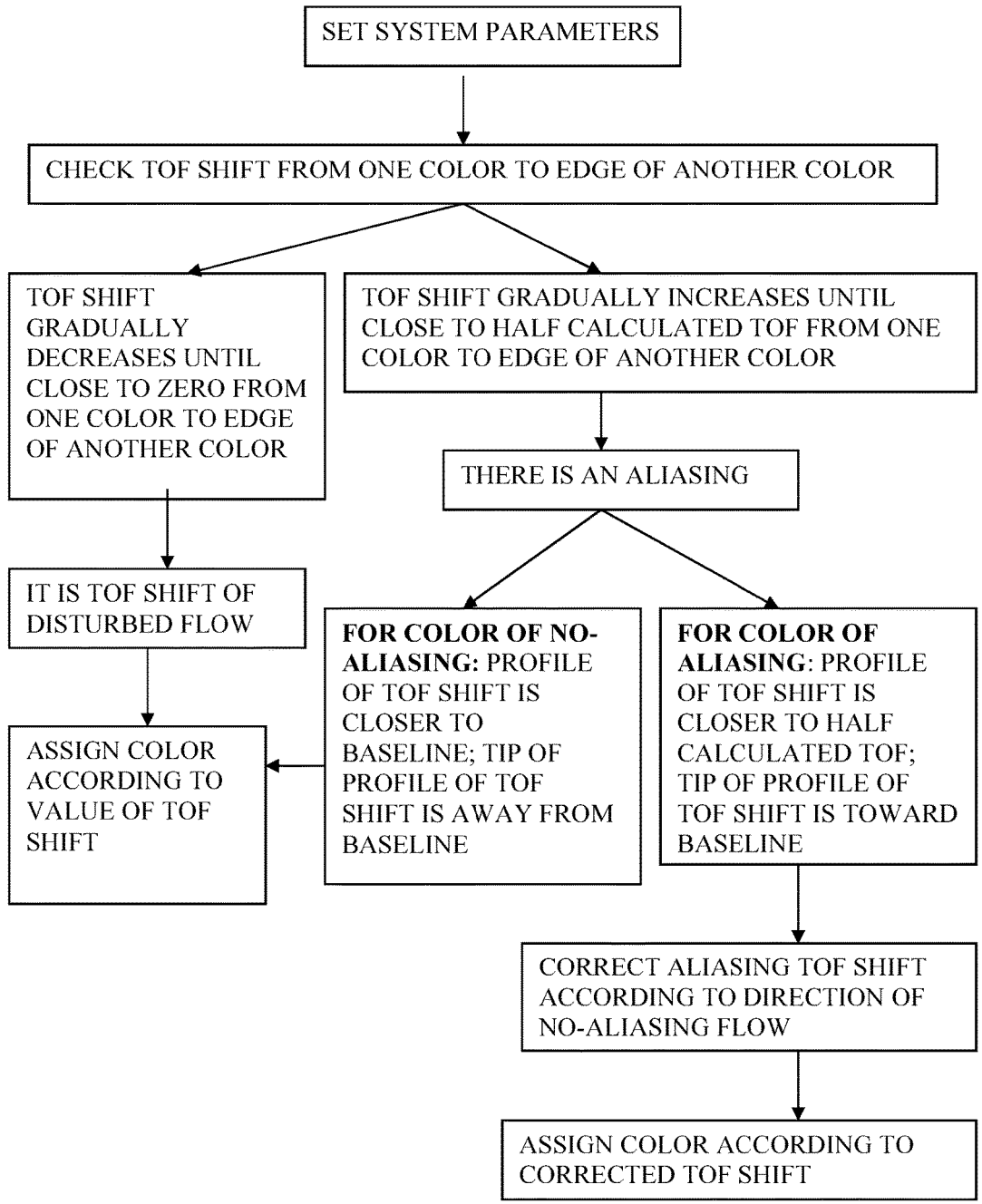
FIG. 11 is a schematic illustration of computer program to differentiate the color of turbulent flow from the color of aliasing and correct color of aliasing based on TOF shift.

For the color of the aliasing in FIG. 9, when a forward flow (S) passes a narrow part of vessel, the speed of a flow will be accelerated within the narrow part. If its actual TOF excesses its aliasing limit, the aliasing TOF shift marks the flow with a color of the aliasing (T) at the narrow part, which represents the flow as toward opposite direction. Color of U represents the flow between the color of the no-aliasing S and the color of the aliasing T, and the value of TOF shift for the color U is close to the value of half calculated TOF because the actual TOF for the color U is closing to its aliasing limit. From the color T to the color U, or from the color S to the color U, their TOF shift is gradually increased until close to the value of half calculated TOF. For the color of the aliasing, the profile of the aliasing TOF shift will be closer to the value of half calculated TOF with its tip of the profile of the aliasing TOF shift toward baseline. But for the color of the no-aliasing (color S), the profile of the no-aliasing TOF shift will be closer to the baseline with the tip of the profile of the no-aliasing TOF shift away from the baseline. Correcting the aliasing TOF shift is based on the direction of no-aliasing flow as forward or reversely moving direction. Then the color of the aliasing can be corrected based on the corrected TOF shift. The designed computer program in FIG. 11 will trace and identify the characters of the profile of the TOF shift for theses colors, and correct the color of the aliasing by rectifying their aliasing TOF shift.

Figure 10:
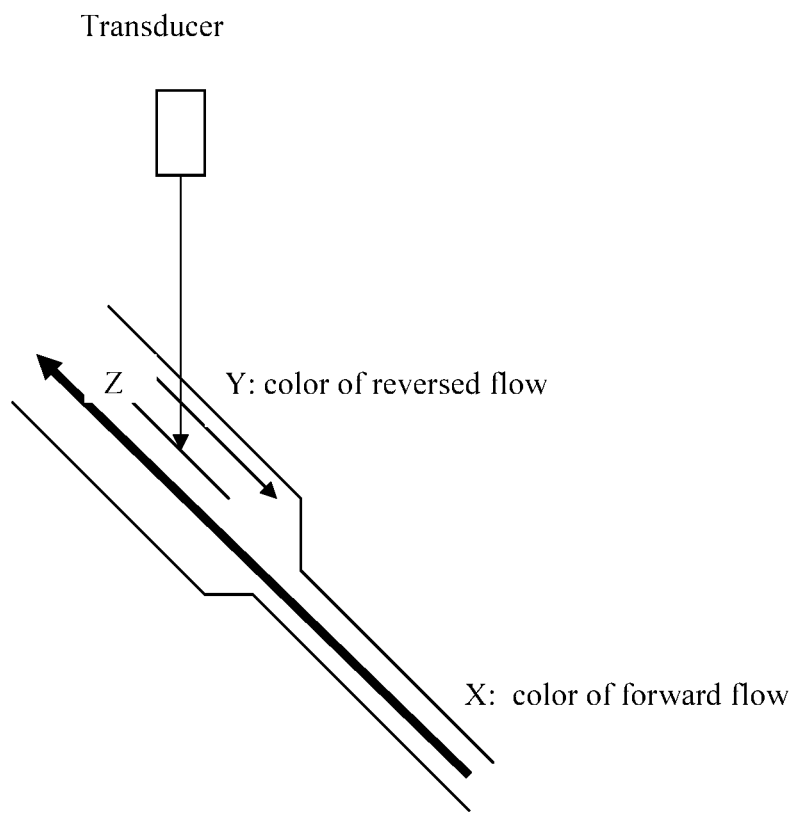
FIG. 10 is a schematic illustration of the colors of turbulent flow in color ultrasound.

But, for the color of the turbulent flows in FIG. 10, the color of X represents a forward flow that enters in an enlarged part of a blood vessel. The flow will become turbulent at the enlarged part of the vessel, and the color of Y represents a reversed blood flow. The color of Z represents the edge between the flow X and the flow Y. The TOF shift for the color Z will be close to zero because its actual TOF is close to its baseline. Because the speed of the flow is gradually decreased to the edge Z, the TOF shift from one color to the edge of another color is gradually reduced until close to the zero. The tip of the profile of the TOF shift for both colors is away from the baseline and the profile of their TOF shift keeps its continuity. The colors of flows are assigned based on their TOF shift.

So, differentiating and correcting the aliasing TOF shift for the color of aliasing from the TOF shift for the color of turbulent flows will benefit the clinical judgment and diagnosis for truly pathological conditions.

Calculation of Velocity of Moving Objects with Two Separated PZT Elements without Need to Adjust the Angle of the Sound Beam The speed value of the moving objects is important in judging some pathological conditions, such as stenosis of blood vessels. The angle of the sound beam with the direction of the moving objects decides the value of TOF shift, which affects the calculation of the speed of the moving objects. Currently in order to get accurate speed of the moving objects, it is important to adjust the angle of the sound beam with the direction of the moving objects within 45 to 60 degree. But, the tortuous blood vessels and variant performances of sonographers often derive different speed values of the moving objects from a same testing site, which increases the difficulties in the clinical diagnosis. In the invention, by simultaneously checking the TOF shifts at same sampling point from two separated PZT elements, the speed value of the moving objects can be accurately calculated without the need to adjust the angle of the sound beams with the direction of the moving objects, which simplifies the operating procedures and avoids the variation of detection.

Figure 13:
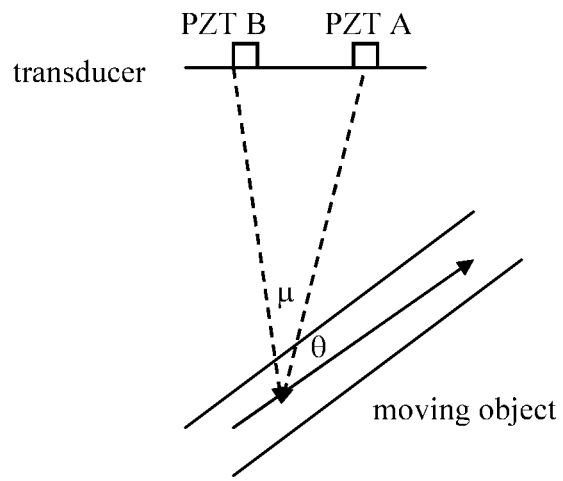
FIG. 13 is a schematic illustration of calculation of speed of moving objects with two separated PZT elements.

As in the FIG. 13, after selecting a sampling point, two TOF shifts are simultaneously detected from PZT A and PZT B, and an angle $\mu$ is between two sound beams from the PZT A and the PZT B, and an angle $\theta$ is between sound beam from the sound beam A with the direction of the moving objects. Therefore, their individual TOF shifts will be obtained, and the speed of the moving objects ($V_{objects}$) can be calculated based on the values of the TOF shifts, the transducer frequency (f), the angle μ and the average speed of the sound pulses in the transmitting medium ($V_{avg}$).

$$TOF\ shift\ A = \frac{2 \times V_{objects} \times f \times \cos(\theta)}{V_{avg}}$$

$$TOF\ shift\ B = \frac{2 \times V_{objects} \times f \times \cos(\theta + \mu)}{V_{avg}}$$

$$V_{objects} = \frac{V_{avg} \times \sqrt{(TOF\ shift\ A)^2 - 2 \times TOF\ shift\ A \times TOF\ shift\ B \times \cos(\mu) + (TOF\ shift\ B)^2}}{2 \times f \times \sin(\mu)}$$

Figure 12:
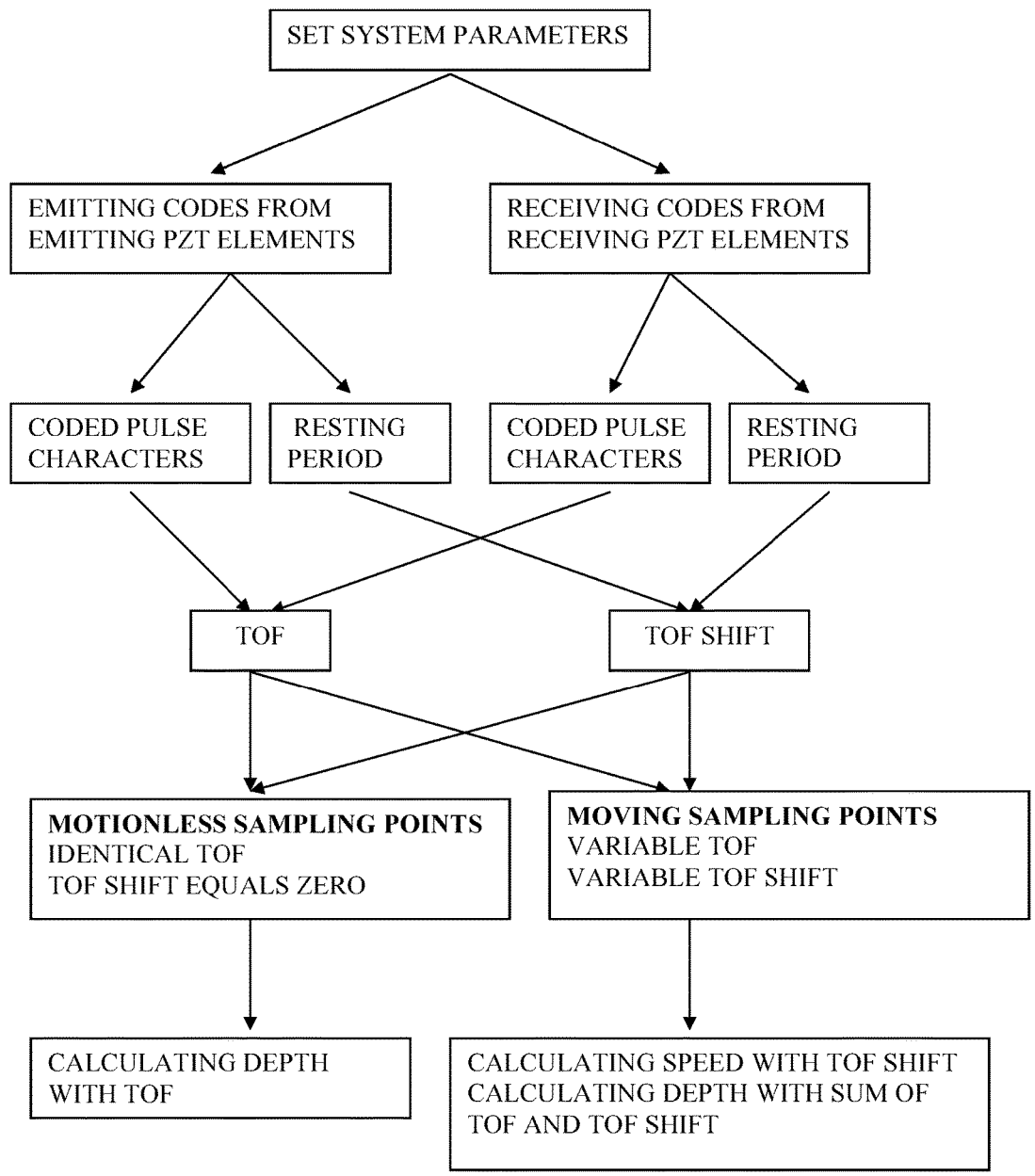
FIG. 12 is a schematic illustration of calculation of detecting depth and moving speed of objects with coded sound pulses.

Calculation of Detecting Depth and Moving Velocity of Objects with Coded Sound Pulses Because the pulsed ultrasound causes the aliasing and the continuous ultrasound loses information of distance, a method of coded sound pulses can combine advantages of the pulsed ultrasound and the continuous ultrasound as well as avoid their disadvantages. This method is more like coding genomic sequence of deoxyribonucleic acid (DNA). A pulse duration is a time that sound pulses are sent. During each pulse duration, different numbers of sound pulses are sent, which is assigned a pulse character. For instance, just one pulse within the pulse duration is assigned as a pulse character A, two pulses as a pulse character C, three pulses as a pulse character G, and four pulses as a pulse character T. A resting period is a time between each adjacent pulse duration, and the resting period for the emitted sound pulses keeps identical. A transducer of the sound system contains one pair or more of sending PZT elements and receiving PZT elements. The sending PZT elements send sound pulses with specific coded pulse characters, such as ATC GCG . . . , which is like codes of a DNA sequence. By this way, it actually endows information of emitting time for each pulse character. The receiving PZT elements receive reflected sound pulses, which contain the same codes of pulse characters, such as A'T'C' G'C'G' . . . , which contains information of receiving time for each pulse character. Therefore, TOF can be obtained from the time between the emitting time and the receiving time of the correlated pulse characters. At the same time, TOF shift can also obtained from the time difference of emitting resting time and receiving resting time of the related pulse characters. For instance, TOF of pulse character A can be obtained from a time between the emitted pulse character A and the reflected pulse character A', and TOF shift can be obtained from a time difference between the emitted resting period of the pulse character A and the receiving resting period of the pulse character A'. If reflections of the sound pulses from one point keep identical TOF and their TOF shift is zero, it means the reflections coming from the sampling points with motionless objects. So, the TOF can be used to calculate the depth or distance of the motionless sampling points. If the value of the TOF and the TOF shift keep variable, it means the reflections coming from the sampling points with moving objects. So, the TOF shift can be used to calculate the velocity of the moving objects. Because the moving objects change the TOF, which can not be used to calculate its actual location. By adding the TOF shift into the TOF, the TOF shift will compensate the changed part of TOF. For the forward moving objects, the TOF shift is positive, which will compensate shortened TOF. For the reversely moving object, the TOF shift is negative, which will offset extended TOF. So, a sum of the TOF shift with the TOF can be used to calculate the depth of the moving objects. The depth of the moving objects is a half multiplication value of the sum of TOF shift and TOF with the average speed of sound in the transmitting medium. Both the velocity and location of the moving objects can be used in imaging the color ultrasound. So, the method of the coded sound pulses combines the advantages of the pulsed ultrasound and the continuous ultrasound in the sound system, which can obtain the information of distance and velocity of the detecting objects at the same time (FIG. 12). It also avoids aliasing for detecting moving objects with high velocity.

Improving Imaging Quality with Coded Sound Pulses

Because each PZT element may not only receive the reflected sound pulses emitted by itself but also receive the reflected sound pulses emitted from other PZT elements, which cause noise and artifacts, such as mirror image or refraction. The noise and artifacts will affect quality of sound images. With each PZT element emits its specific codes of the pulse characters, after receiving reflected sound pulses, the sound system will compare the received codes of the pulse characters with the emitted ones, and register locations of the sampling points that have the same received codes of the pulse characters with the emitted codes of the pulse characters to an area belonging to the PZT element that emits the codes of the pulse characters. By this way, it will improve the noise and the artifacts.

Constructing Three Dimension Imaging with Coded Sound Pulses

By coded sound pulses as mentioned above, two-dimension (2D) dataset (x, y, v) for sampling points can be established with their 2D position value of x and y, and velocity value of v, which form 2D images. By obtaining a three-dimension (3D) dataset (x, y, z, v) from plurality of succession of 2D dataset, the value of z represents a position of the sampling points in a volumetric imaging array. With related 3D computer program, the 3D dataset can be used to construct 3D images from the sampling points. The value of v will be used to establish 3D images for the sampling points from motionless objects, and/or from moving objects, such as modeling vascular structures, which help clinical diagnosis.

Improving Temporal Resolution with Coded Sound Pulses

Coded sound pulses decrease time for each frame, which increase frame rate and temporal resolution for 2D and 3D imaging. So, it benefits to image objects that move over time.

Other applications, advantages, alternations, modifications, or equivalents to the disclosed embodiments are obvious to those skilled in the art and are intended to be encompassed within the scope of the present disclosure.

What is claimed is:

1. A method for correctly registering a position of sampling points on a sound imaging system by calculating a detecting depth based on speed reduction of sound pulses during a transmission, the method comprising:

Establishing a sound imaging system containing piezoelectric (PZT) elements within a transducer, wherein the PZT elements send sound pulses and receive reflected sound pulses from the sampling points to calculate time-of-flight (TOF) of the sound pulses;

establishing a speed reducing coefficient of the sound pulses in a transmitting medium, which contains various speed affecting factors for the sound pulses, containing a density of the transmitting medium, a density and a thickness of the PZT elements, TOF, and constant value (k), which comprising:

$$\text{Speed reducing coefficient} = \frac{k \times \text{medium density} \times TOF}{PZT \text{ density} \times PZT \text{ thickness}}$$

obtaining an average speed ($V_{avg}$) of the sound pulses in the transmitting medium based maximal speed of the sound pulses as they just leave the transducer and the speed reducing coefficient, which comprising:

$$V_{avg} = V_m \times \left(1 - \frac{k \times \text{medium density} \times TOF}{PZT \text{ density} \times PZT \text{ thickness}}\right);$$

calculating a detecting depth of the sampling points based the average speed and the TOF, wherein the detecting depth of the sampling points is a half multiplication value of the average speed and the TOF of the sound pulses in the transmitting medium; and correctly registering the position of the sampling points on the sound imaging system based on the calculated detecting depth of the sampling points, wherein a compromised detecting depth of the sampling points based on current fixed sound speed is rectified, which improves the imaging quality.

2. A method of claim 1, further comprising regulating an intensity of the sound pulses to control their traveling distance; the intensity of the sound pulses is a multiplication value of the length of the sound pulses and the density of the sound pulses and the speed of the sound pulses, which comprising:

Sound intensity(kg/MS)=sound length(M)×sound density(Kg/M³)×sound speed(M/S)

M=meter; Kg=kilogram; S=second.

3. The method of claim 2, further comprising optimizing depth related imaging by compounding sound pulses with different length to focus at their appropriate detecting depth.

4. The method of claim 3, further comprising increasing detecting depth for high frequency sound pulses by increasing the density and the speed of the sound pulses wherein the thickness of the PZT elements decides the length of the sound pulses as well as limits the highest frequency a sound system can reach.

5. The method of claim 2, further comprising improving axial resolution by decreasing the length of the sound pulses.

6. A method of using the TOF shift of the sound pulses to calculate a speed of moving objects at fixed sampling points in the sound imaging system with different formats of the sound pulses, containing a continuous and a pulsed sound, the method comprising:

setting a baseline wherein the baseline in the pulsed sound is a calculated TOF between a transducer and a gate and in the continuous sound is a time of an emitted period, and a TOF shift equals to zero at the baseline;

for pulsed sound, detecting TOF is a time from sending sound pulses to receiving the reflected sound pulses from a sampling point, and for continuous sound, a reflected period is a time between two consecutive reflected sound pulses from a sampling point;

calculating the TOF shift wherein the TOF shift for the pulsed sound is a time difference between the calculated TOF and the detected TOF, and TOF shift for the continuous sound is a time difference between is the emitted period and the reflected period; and calculating the speed of the moving objects at the fixed sampling points with an equation of the TOF, comprising the speed of the moving objects ($V_{objects}$) at the fixed sampling points, an angle θ of the sound beam made with the moving objects, the average speed ($V_{avg}$) of the sound pulses in the transmitting medium, the transducer frequency (f), wherein the TOF shift is the TOF shift for the continuous, the pulsed and the color ultrasound, the equation of the TOF shift is:

$$TOF \text{ shift} = \frac{2 \times V_{objects} \times f \times \cos(\theta)}{V_{avg}};$$

and registering the calculated speed of the moving objects at the fixed sampling points into the sound imaging system according the formats of the sound pulses, wherein the calculated speed of the moving objects at the fixed sampling points is more accurate because the equation of the TOF shift correctly establishes correlated relationship between the TOF shift with the various speed affecting factors of the sound pulses containing in the average speed of the sound pulses, which compensate effects of these affecting factors on a variation of the TOF shift.

7. The method of claim 6, further comprising calculating a speed of the moving objects by simultaneously detecting TOF shift at same site from two separated PZT elements, wherein the speed of the moving objects can be calculated based on the values of the TOF shifts, the transducer frequency, the angle μ between two sound beams from the PZT elements and the average speed of the sound pulses in the transmitting medium as the following equation:

$$V_{objects} = \frac{V_{avg} \times \sqrt{(TOF \text{ shift } A)^2 - 2 \times TOF \text{ shift } A \times TOF \text{ shift } B \times \cos(\mu) + (TOF \text{ shift } B)^2}}{2 \times f \times \sin(\mu)}.$$

8. The method of claim 6, further comprising changing the intensity and the angle of the sending sound pulses to regulate the speed of the reflected sound pulses wherein the changes of the speed of the reflected sound pulses alter the TOF and the TOF shift of the sound pulses.

9. The method of claim 6, further comprising a method of calculating the velocity of the moving objects for the continuous ultrasound comprising:

setting a time of an emitted period as the baseline wherein the time of the emitted period is the time between previously and following emitted pulses;

obtaining a time of a reflected period for each sampling points below the PZT elements wherein the time of the reflected period is the time between previously and following reflected sound pulses;

calculating a TOF shift for these sampling points wherein the TOF shift is a time difference between the time of the emitting period and the time of the reflected period, and the TOF shift is variable for the sampling points with the moving objects; and using the TOF shift to calculate the velocity of the moving objects based on the equation of TOF shift.

10. The method of claim 6 further comprising a method of calculating the velocity of the moving objects for the pulsed and the color ultrasound comprising:

setting a time of a calculated TOF as the baseline wherein the calculated TOF is the time that sound system calculates according to a distance between a transducer and a gate and the average speed of the sound pulses in the transmitting medium;

obtaining the detected TOF wherein the detected TOF is the time that sound system interprets from sound pulses traveling between the transducer and the gate, before an aliasing the detected TOF is an actual TOF, and the actual TOF is a truly traveling time of the sound pulses;

calculating a TOF shift wherein the TOF shift is a time difference between the value of the calculated TOF and the value of the detected TOF; and using the TOF shift to calculate the velocity of the moving objects based on the equation of the TOF shift.

11. The method of claim 10 further comprising a method to correctly calculate the velocity of the moving objects after the aliasing for the pulsed and the color ultrasound comprising:

identifying an aliasing TOF, wherein as the actual TOF excesses its aliasing limit, the detected TOF is misinterpreted by sound system to generate the aliasing TOF, the aliasing TOF shift is on opposite site of the baseline and disrupts continuity of a profile of the TOF shift, and a tip of a profile of the aliasing TOF shift is toward the baseline;

obtaining a corrected TOF shift by rectifying the aliasing TOF shift to correct registration of the reflected sound pulses after the actual TOF exceeds the aliasing limit, the tip of the profile of corrected TOF shift is away from the baseline, and the corrected TOF shift reconstructs the continuation of the profile of the TOF shift; and using the corrected TOF shift to calculate the velocity of the moving objects based on an equation of corrected TOF shift:

$$\text{Corrected } TOF \text{ shift} = \frac{2 \times V_{objects} \times f \times \cos(\theta)}{V_{avg}}.$$

12. The method of claim 11, wherein for forward moving objects, the velocity of the moving objects is correctly calculated after the aliasing by:

identifying the aliasing for the forward moving objects wherein the aliasing limit for the actual TOF is less than a value of half calculated TOF; after the actual TOF excesses the aliasing limit, the sound system misinterprets the detected TOF by adding a value of one calculated TOF to a value of the actual TOF to form an aliasing TOF, the value of the aliasing TOF is greater than the value of the baseline and its TOF shift is located on an opposite site of the baseline, and the aliasing TOF shift disrupts the continuation of the profile of the TOF shift, and the tip of the profile of the aliasing TOF shift is toward the baseline;

obtaining the corrected TOF shift by subtracting a value of the aliasing TOF shift from a value of the calculated TOF to reestablish the continuation of the profile of the TOF shift; and using the corrected TOF shift to calculate the velocity of the forward moving objects based on the equation of corrected TOF shift.

13. The method of claim 11, wherein for reversely moving objects, the velocity of the moving objects is correctly calculated after the aliasing by:

identifying the aliasing for the reversely moving objects wherein the aliasing limit for the actual TOF is greater than the value of one and half calculated TOF; after the actual TOF excesses the aliasing limit, the sound system misinterprets the detected TOF by subtracting a value of one calculated TOF from a value of the actual TOF to form an aliasing TOF; the value of the aliasing TOF is smaller than the value of the baseline and the aliasing TOF shift is located on the opposite site of the baseline, and the aliasing TOF shift disrupts the continuation of the profile of the TOF shift, and the tip of the profile of the aliasing TOF shift is toward the baseline;

obtaining the corrected TOF shift by subtracting a value of the calculated TOF shift from a value of the aliasing TOF shift to reestablish the continuation of the profile of the TOF shift; and using the corrected TOF shift to calculate the velocity of the reversely moving objects based on the equation of corrected TOF shift.

14. The method of claim 10 further comprising a method of avoiding the aliasing by modifying the computer program in the sound system to prevent adding or subtracting a value of a calculated TOF from the detected TOF after the actual TOF excesses its aliasing limit.

15. The method of claim 11, further comprising a method of differentiating a color of the aliasing from a color of turbulent flows and rectifying the color of the aliasing for the color ultrasound comprising:

identifying the aliasing TOF shift for the color of the aliasing wherein from one color to a edge of another color, the value of their TOF shift is gradually increased until close to the value of half calculated TOF, and the profile of the aliasing TOF shift is more close to the value of half calculated TOF, and the tip of the profile of the aliasing TOF shift is toward the baseline; a color of no-aliasing represents a flow before its actual TOF excesses the aliasing limit, the profile of the no-aliasing TOF shift is more closer to the baseline, and the tip of the no-aliasing TOF shift is away from the baseline;

identifying the TOF shift for the color of turbulent flows wherein from one color to a edge of another color, the value of their TOF shift is gradually decreased until close to zero, the tip of the profile of the TOF shift for the color of turbulent flows is away from the baseline; and rectifying the color of the aliasing wherein the aliasing TOF shift is corrected according to the direction of the no-aliasing flow, and the color of the aliasing is corrected based on the value of the corrected TOF shift.

16. A method for the sound imaging system to obtain both information of the depth and the velocity of the objects from the fixed sampling points with coded sound pulses comprising:

a transducer contains one pair or more of emitting PZT elements and receiving PZT elements, assigning different numbers of the sound pulses within each pulse duration to form different pulse characters, a resting period is a time between each adjacent pulse duration;

the emitting PZT elements emit specifically coded pulse characters, which endow information of an emitting time for each pulse character, and the resting period for the emitted sound pulses keeps identical;

the receiving PZT elements receive reflected sound pulses, and decode received pulse characters to compare with the emitted codes of the pulse characters, TOF is obtained from a time between the emitted pulse character and the same reflected pulse character, and TOF shift is obtained from a time difference between the emitted resting period and the correspondingly received resting period;

identifying motionless sampling points from the reflected sound pulses with identical value of the TOF and zero value of the TOF shift, therein the depth of the motionless sampling points is calculated from the TOF;

identifying moving sampling points from the reflected sound pulses with variable values of the TOF and the TOF shift, therein the velocity of the moving sampling points is calculated with the equation of the TOF shift, the depth of the moving sampling points is a half multiplication value of the sum of the TOF and the TOF shift with the average velocity of sound in the transmitting medium, for forward moving sampling points, the TOF shift is positive value, and for reversely moving sampling points, the TOF shift is negative value, the equation of calculating the depth of the moving sampling points comprising:

depth of moving sampling points=$V_{avg} \times (TOF+TOF\ shift)/2$; and registering the position and the velocity of the objects from the sampling points into the sound imaging system, wherein the coded sound pulses take advantages from both the pulsed sound and the continuous sound to simultaneously obtain both information of the depth and the velocity of the objects from the sampling points, as well as avoid aliasing, which will be used to construct two dimensional and three dimensional images.

17. The method of claim 16 further comprising improving noise and artifacts with coded sound pulses wherein by comparing the received codes of the pulse characters with the emitted codes of the pulse characters, the reflections of the coded sound pulses from the sampling points that have the identical received codes of the pulse characters with the emitted codes of the pulse characters will be registered to an area that belongs to the PZT element that emits the codes of the pulse characters.

18. A method of claim 16, further comprising applications in construction of three dimensional images for motionless and/or moving sampling points with the coded sound pulses comprising:

obtaining a dataset (x, y, v) of two dimension (2D) images with the coded sound pulses, the values of x and y represent a value of two axes of the sampling points in 2D images, a value of v represents a velocity of the sampling points, which comes from TOF shift;

obtaining a dataset (x, y, z, v) of three orthogonal axes from plurality of succession of 2D dataset, a value of z represents a position of the objects in a volumetric image array; and constructing 3D images for motionless and/or moving sampling points with related computer programs by using the obtained data of three orthogonal axes (x, y, z), and the value of v can be used to represent the status of movement and velocity of objects with different colors.

19. A method of claim 16, further comprising improving 2D and 3D imaging quality by increasing temporal resolution with coded sound pulses.

* * * * *